United States Patent [19]

Janz et al.

[11] Patent Number: 4,799,938

[45] Date of Patent: Jan. 24, 1989

[54] α-AL$_2$O$_3$ ABRASIVE MATERIAL AND METHOD OF PREPARING THE SAME

[75] Inventors: Peter Janz; Georg Gottschamel, both of Carinthia, Austria

[73] Assignee: Treibacher Chemische Werke AG, Treibach, Austria

[21] Appl. No.: 99,752

[22] Filed: Sep. 22, 1987

[30] Foreign Application Priority Data

Oct. 3, 1986 [AT] Austria ............................... 2630/86

[51] Int. Cl.$^4$ ............................................. B24D 13/00
[52] U.S. Cl. ...................................... 51/293; 51/307; 51/309
[58] Field of Search .......................... 51/293, 307, 309

[56] References Cited

U.S. PATENT DOCUMENTS

| | | | |
|---|---|---|---|
| 3,615,306 | 10/1971 | Jones, II et al. | 51/293 |
| 3,615,307 | 10/1971 | Jones, II | 51/309 |
| 3,637,360 | 1/1972 | Ueltz et al. | 51/293 |
| 3,802,893 | 4/1974 | Kiger et al. | 51/309 |
| 4,314,827 | 2/1982 | Leitheiser et al. | 51/309 |
| 4,331,627 | 5/1982 | Yamamoto et al. | 51/309 |
| 4,518,397 | 5/1985 | Leitheiser et al. | 51/309 |
| 4,568,363 | 2/1986 | Meloon | 51/309 |

Primary Examiner—Paul Lieberman
Assistant Examiner—Willie J. Thompson
Attorney, Agent, or Firm—Kurt Kelman

[57] ABSTRACT

A sintered, microcrystalline abrasive material consists of at least 99.5%, by weight, of α-Al$_2$O$_3$ crystallites having a size of less than 2 μ and the material having a density of at least 97% of the theoretical density. This abrasive material has a very high abrasive property and can be used in grinding bands or discs.

12 Claims, No Drawings

α-AL₂O₃ ABRASIVE MATERIAL AND METHOD OF PREPARING THE SAME

The present invention relates to a sintered, microcrystalline abrasive material consisting essentially of α-Al₂O₃, and to a method of preparing the same.

In addition to a method of preparing corundum abrasive materials by melting aluminum oxide in an electric arc furnace, other methods have been proposed for the manufacture of such materials on the basis of α-Al₂O₃ by sintering.

Bauxite and clay as well as finely dispersed aluminum oxide monohydrate may be used as raw materials for the preparation of sintered abrasive materials.

For example, U.S. Pat. No. 4,314,827 discloses a microcrystalline abrasive material consisting essentially of α-Al₂O₃, which has been produced by drying and sintering an aluminum oxide hydrate gel at a temperature of about 1400° C. To obtain a good abrasive quality, it is necessary, however, to add at least one modifying component, such as at least 10% of $ZrO_2$ and/or $HfO_2$ and/or at least 1% of a spinel of $Al_2O_3$ with oxides of Co, Ni, Nz or Mg.

Published European patent application No. 0 152 768 discloses an abrasive material prepared by sintering an aluminum oxide hydrate gel, very fine α-Al₂O₃ particles being present as seed crystals to reduce the conversion temperature of α-Al₂O₃ in the gel to the α-Al₂O₃ form. It is possible to add oxides of Si, Cr, Mg and Zr as inhibitors of the crystal growth to the gel. Nevertheless, crystallites up to a magnitude of 8μ (depending on the sintering conditions) are found in this material, in addition to the crystallites of sub-micron size. These large crystallites are presumably due to the presence of the α-Al₂O₃ particles (seed crystals) in the dried product because, even with the greatest care in the preparation, the larger particles are present in addition to the sub-micron crystallites. But even the smallest α-Al₂O₃ particles are larger than the α-Al₂O₃ seed crystals coming from the gel, which favors an uneven crystallite growth.

It is the primary object of this invention to produce an α-Al₂O₃ abrasive material which is characterized by a high density, outstanding purity and high uniformity of its microcrystalline structure.

This object is accomplished according to one aspect of the invention with a sintered, microcrystalline abrasive material consisting essentially of α-Al₂O₃, said abrasive material consisting of at least 99.5%, by weight, of α-Al₂O₃ crystallites having a size of less than 2μ and the material having a density of at least 97% of the theoretical density.

According to another aspect of the present invention, there is provided a method of preparing such an abrasive material, which comprises the steps of stirring a highly dispersed α-aluminum oxide hydrate into a dilute acidic solution until a suspension of the α-aluminum oxide hydrate has been formed, subjecting the suspension to a vacuum venting to remove occluded air therefrom, dispersing the vented suspension to disagglomerate the same, removing any residual coarse particles from the dispersed suspension, drying the dispersed suspension to obtain a dry material, comminuting the dried material, and sintering the dried material at a temperature between 1000° C. and 1500° C.

The abrasive material of this invention has excellent abrasive properties and may be used in grinding bands as well as discs. It has been found unexpectedly that the microcrystalline structure combined with a high density and purity of the alumina may be obtained by suitably disagglomerating the finely dispersed α-aluminum oxide hydrate without the need for a high spinel content or the presence of α-Al₂O₃ in the dried product. The conversion in the α-Al₂O₃ begins at a temperature below 1000° C. With a set sintering temperature, the difference between it and the conversion temperature is larger, which leads to the formation of a larger number of α-Al₂O₃ seed crystals, causing a higher uniformity of the microcrystalline structure even at extended sintering times.

A small addition of a salt of an element from the group consisting of Mg, Ca, Co, Ni, Cr, Fe, Ti, Si, Zn, Mn and Zr has been found advantageous, such salts being converted to the corresponding oxides during sintering. This additive is added to the dispersed suspension in the dispersing vessel and comprises no more than 0.2%, preferably less than 0.1%, by weight, based on the oxide in the end product. Such additives are known to reduce the non-uniform and high crystal growth during sintering.

The disagglomeration of the suspended particles passes through a maximum in dependence on the ratio of shearing velocity:throughput. If the shearing velocity is too low, the energy is insufficient and, if it is too high, reagglomeration occurs. The optimum of the shearing velocity must be established experimentally for the disagglomeration apparatus.

Any residual agglomerates remaining after the vented suspension has been disagglomerated are removed, preferably by centrifuging.

It has further been found unexpectedly that the removal of occluded air from the suspension before the same is subjected to disagglomeration produces a further improvement of the abrasive material. This is due to the fact that finely dispersed air bubbles increase the porosity of the final product and thus unfavorably influence the density and hardness thereof. Pores having a size exceeding 0.4μ cannot be eliminated by sintering because the larger pores grow during sintering at the expense of the smaller pores. Such large pores could be removed only at extremely high sintering temperatures. Therefore, to enable a lower sintering temperature to be used, the suspension is vacuum vented to remove occluded air which may leave pores or cavities in the product after drying and sintering. Air bubbles of small diameter rise slowly, and the velocity of rising of the air bubbles increases with the square of the diameter of the bubbles in the dispersion. For example, with a suspension having a height of 150 mm and using a pressure of 0.4 bar, it takes more than two hours to obtain a suspension substantially free of occluded air and ready to be sintered. From this, it can be calculated that all air occlusions having a diameter exceeding 7μ must be removed. To do this in as short a time as possible, a small thickness of the suspension layer is required. The experiments were effected with a vacuum venting apparatus of the type VE/FRYMA. The suspension containing the occluded air is distributed by a special device in the vacuum chamber in a thin layer so that the air occlusions expand and burst. A dwell time of less than one minute at a pressure of 0.1 bar was sufficient to remove the occluded air from a suspension layer of 1 mm thickness.

The highly dispersible α-aluminum oxide hydrates commercially available as pseudobohmites under the trademarks Pural, Dispersal and Versal may be used in the method of the present invention. The solids content of the suspension was between 5% and 40%, preferably 15-25%, by weight. The acidic solution may be nitric, hydrochloric or acetic acid.

The optional additives added during the disagglomeration are inorganic or organic salts of elements of the group consisting of Mg, Ca, Co, Ni, Cr, Fe, Ti, Si, Zn, Mn and Zr, which are converted to the corresponding oxides during sintering. They are added in a maximum amount of 0.2%, by weight, based on the oxide in the end product, preferably less than 0.1%. The salts of the corresponding acidic solution were found to be most advantageous.

The suspension coming from the dispersing apparatus is dried, for example in a hot air box at temperatures between 80° C. and 120° C. for several hours.

The dried material was comminuted and then sintered in a furnace at a temperature of 1000° C. to 1500° C. The sintering time decreases with an increase in temperature, and is between a few minutes to two hours.

The abrasive material produced by the hereinabove described method was used in the manufacture of grinding bands and grinding discs, and the effectiveness of the material was determined in a comparative test series against carbon steel C 45 by comparing its abrasive capacity with that of electromelt corundum (=100%). The resultant values are indicated in the Table hereinbelow and clearly show the excellent abrasive quality of the abrasive material of the present invention.

The invention will be further elucidated in the following Examples:

EXAMPLE 1

Ten kilograms of $\alpha$-aluminum oxide monohydrate powder sold under the trademark Dispersal were continuously stirred into a solution of 39.5 kg water and 440 g concentrated nitric acid. The resultant suspension was then vented at a pressure of 100 mbar in a laboratory vacuum venting apparatus of the type LVE/A/FRYMA and subsequently pumped through a fast-running dispersing apparatus with two inlets. The through-put velocity was 3 l/h and the dispersing rotor was run at a speed of about 15,000 rpm. The second inlet of the dispersing apparatus remained closed. The disagglomerated suspension was placed into polyethylene saucers in layers of about 5 cm thickness and dried in a hot air box at an air temperature of 80° C. for 36 hours until the layers on the saucers became hard, brittle plates. The dried plates were milled to produce transparent grains and the grains were classified in a screening machine. The sub-sized grains were recycled for use in preparing the suspension. The green grains were charged into an electric arc furnace which was heated for seven hours to a temperature of 1400° C. and then sintered at that temperature for about two hours. The density of the sintered material was 98.1% of the theoretical density and the crystallite size was below $2\mu$.

EXAMPLE 2

The preparation and the venting of the dispersion was the same as in Example 1. However, a solution of 6.3 g/l of magnesium nitrate was introduced into the dispersing apparatus through the second inlet at a velocity of 270 ml/h. The suspension was then treated in the same manner as in Example 1, i.e. the only difference in this method as compared to that of Example 1 was the addition of the magnesium nitrate. The sintered end product contained 0.05%, by weight, of MgO and had a density of 99.0% of the theoretical density. The crystallite size was less than $1\mu$.

COMPARATIVE EXAMPLE

The preparation of the abrasive material followed the procedure of Example 2, with the single exception that the suspension was not subjected to vacuum venting. The density of the resultant sintered material was 75% of the theoretical density.

TABLE

| | Grinding Test Results | |
| | Abrasive Efficiency (%) | |
| Material | Fiber Disc | Band |
| --- | --- | --- |
| Electromelt corundum | 100 | 100 |
| Zr—melt corundum | 220 | 310 |
| Example 1 | 290 | 360 |
| Example 2 | 330 | 400 |
| Comparative Example | 90 | 95 |

What is claimed is:

1. A method of preparing a sintered, microcrystalline abrasive material consisting essentially of $\alpha$-$Al_2O_3$, said abrasive material consisting of at least 99.5%, by weight, of $\alpha$-$Al_2O_3$ crystallites having a size of less than $2\mu$ and the material having a density of at least 97% of the theoretical density, which comprises the steps of
    (a) stirring a highly dispersed $\alpha$-aluminum oxide hydrate into a dilute acidic solution until a suspension of the $\alpha$-aluminum oxide hydrate has been formed,
    (b) subjecting the suspension to a vacuum venting to remove occluded air therefrom,
    (c) dispersing the vented suspension to disagglomerate the same,
    (d) removing any residual coarse particles from the dispersed suspension,
    (e) drying the dispersed suspension to obtain a dry material,
    (f) comminuting the dried material, and
    (g) sintering the dried material at a temperature between 1000° C. and 1500° C.

2. The method of claim 1, wherein the solids content of the suspension is between 5% and 40%, by weight.

3. The method of claim 2, wherein the solids content of the suspension is between 15% and 25%, by weight.

4. The method of claim 1, wherein the diluted acidic solution comprises nitric, hydrochloric or acetic acid.

5. The method of claim 1, wherein the vacuum venting is effected at a pressure of less than 0.2 bar on a thin layer of the suspension.

6. The method of claim 1, comprising the further step of adding at least one additive to the dispersed suspension, the additive being selected from a salt of an element of the group consisting of Mg, Ca, Co, Ni, Cr, Fe, Ti, Si, Zn, Mn and Zr.

7. The method of claim 6, wherein no more than 0.2%, by weight, based on the oxide in the $\alpha$-$Al_2O_3$, of the additive is added.

8. The method of claim 7, wherein no more than 0.1%, by weight, based on the oxide in the $\alpha$-$Al_2O_3$, of the additive is added.

9. The method of claim 6, wherein the salt is magnesium nitrate, magnesium chloride or magnesium acetate.

10. The method of claim 1, wherein any residual coarse particles are removed from the dispersed suspension by centrifuging.

11. The method of claim 1, wherein the dried material is sintered for a period of 10 minutes to two hours.

12. The method of claim 11, wherein the dried material is sintered at a temperature between 1300° C. and 1450° C.

* * * * *